United States Patent [19]

Köhler et al.

[11] Patent Number: 4,960,855

[45] Date of Patent: Oct. 2, 1990

[54] POLYARYLENE ETHER CONTAINING BENZOXAZOLE GROUPS AND A PROCESS FOR THEIR PREPARATION

[75] Inventors: Burkhard Köhler; Rolf-Volker Meyer, both of Krefeld, Fed. Rep. of Germany

[73] Assignee: Bayer Aktiengesellschaft, Leverkusen, Fed. Rep. of Germany

[21] Appl. No.: 354,810

[22] Filed: May 22, 1989

[30] Foreign Application Priority Data

Jun. 2, 1988 [DE] Fed. Rep. of Germany ....... 3818763

[51] Int. Cl.$^5$ .............................................. C08G 65/40
[52] U.S. Cl. ..................................... 528/211; 528/210
[58] Field of Search ................................ 528/210, 211

[56] References Cited

FOREIGN PATENT DOCUMENTS 0186153 7/1986 European Pat. Off. .
2067512 8/1971 France ................................. 528/210

OTHER PUBLICATIONS

Patent Abstracts of Japan, Band 11, nr. 75 (C-408)(2522)1987; & JP -A-61 231026 (Idemitsu Kosan Co. Ltd.) 1986.

Primary Examiner—Harold D. Anderson
Attorney, Agent, or Firm—Connolly and Hutz

[57] ABSTRACT

This invention relates to polyarylene ethers containing benzoxazole groups and to a process for their preparation.

9 Claims, No Drawings

POLYARYLENE ETHER CONTAINING BENZOXAZOLE GROUPS AND A PROCESS FOR THEIR PREPARATION

This invention relates to polyarylene ethers containing benzoxazole groups and to a process for their preparation.

Polyarylene ethers are an important class among the synthetic resins which have high dimensional stability under heat. They are distinguished inter alia by their low flammability. They also have little tendency to oxidize. Amorphous polyarylene ethers have well known advantages such as the ability to withstand heat while partially crystalline polyarylene ethers, e.g. .PEEK, have a high resistance to solvents and chemicals.

Polyphenylene oxide (ppO), polyether sulphones (PES, PSO), polyether ketones (PEEK) and polyether imides (PEl) are examples of aromatic polyethers which have become technologically important.

These polymers may be prepared, for example, by a nucleophilic exchange reaction in dipolar aprotic solvents in accordance with the following reaction scheme:

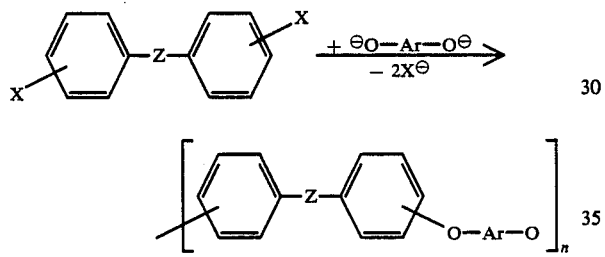

(X=Hal, Ar=C$_6$-aryl, n=an integer from 10 to 1000).

These polymers contain a functional group Z in addition to the ether groups. This functional group is capable of activating the dihalogen aromatic compound for a nucleophilic exchange reaction but such a functional group Z cannot itself react, e.g. hydrolytically in the case of cyano or imide groups, or radically in the case of sulphone groups or photochemically in the case of keto groups.

The activating group Z may be incorporated in the main chain of the polymer but it may also be attached as substituent to the aromatic group containing halogen or nitro groups.

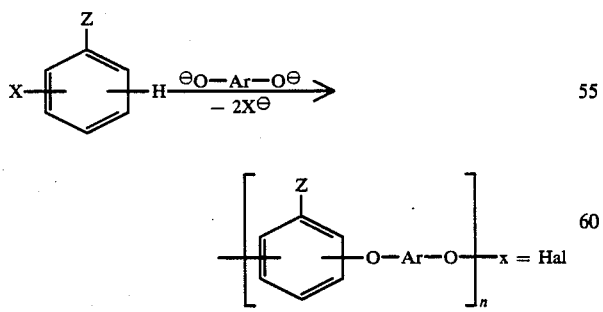

The groups Z are preferably electron attracting. For example, one cyano group is sufficient to bring about activation. Thus polyarylene ethers which have no other functionality in the polymer main chain may be prepared from dihalogenobenzonitriles and bisphenols (e.g. JA-OS 61 231 026; EP-OS 186 153; Macromol. Chem., Rapid Commun. 8, 529–534 (1987)).

The cyano group is, however, readily attacked hydrolytically.

It would therefore be desirable to have a polyarylene ether containing substantially inert activating groups Z outside the polymer chain.

It has now been found that new polyarylene ethers which have a satisfactory resistance to hydrolysis may be obtained from 2-dihalogenophenyl benzoxazoles and bisphenolates in dipolar aprotic solvents.

The present invention therefore relates to polyarylene ethers containing benzoxazole groups and obtained from monomer units corresponding to formulae I and II

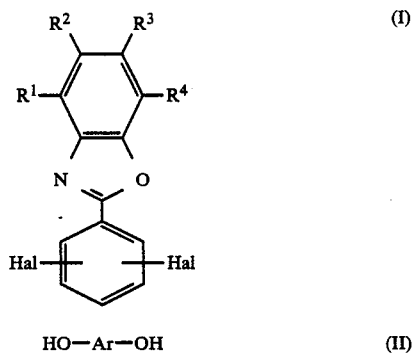

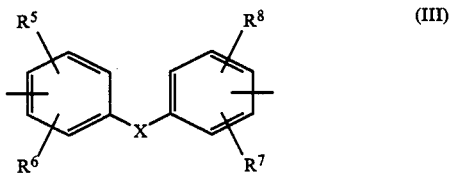

wherein

R$^1$, R$^2$, R$^3$ and R$^4$ denote, independently of one another, hydrogen, C$_1$ to C$_{20}$ alkyl, preferably methyl, C$_6$ to C$_{14}$ aryl, C$_7$ to C$_{14}$ alkaryl or arylalkyl and one of the groups R$^1$ to R$^4$, preferably R$^2$, may also stand for Hal, preferably chlorine, and any two groups in the ortho position to one another may also be members of a ring containing up to 12 carbon atoms, preferably a benzo group, Hal denotes fluorine, chlorine, bromine or iodine, preferably chlorine, and the Hal groups substitute the 2,4- or 2,6-positions of the phenyl ring and Ar denotes m- or p-phenylene or naphthylene or corresponds to formula III $$\begin{array}{c} R^5 \qquad\qquad R^8 \\ \phantom{xx}\diagup\!\!\!\!\diagdown\;\;\;\diagup\!\!\!\!\diagdown \\ \phantom{x}\diagdown\!\!\!\!\diagup\text{—X—}\diagdown\!\!\!\!\diagup \\ R^6 \qquad\qquad R^7 \end{array} \qquad (III)$$

wherein

X denotes a chemical bond, an oxygen atom, a sulphur atom, a sulphone group or C$_1$ to C$_{20}$ alkylene, preferably 2,2'-propylene, and R$^5$ to R$^8$ denote, independently of one another, hydrogen, C$_1$ to C$_{20}$ alkyl, preferably methyl, C$_6$ to C$_{14}$ aryl or a halogen atom.

The present invention further relates to a process for the preparation of the benzoxazole group-containing polyarylene ethers according to the invention, characterised in that monomers corresponding to formulae (I) and (II) are used in a molar ratio of (I):(II) of from 0 98:1 to 1 02:1 and, based on the quantity of monomer units of formula (11) put into the process, from 1 to 2, preferably 1 to 1.2 equivalents of a base are used and the reaction is carried out in a dipolar aprotic solvent corresponding to formula (IV), (V) or (VI)

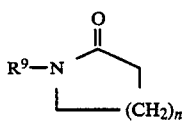 (IV)

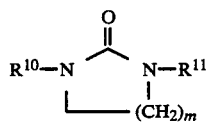 (V)

 (VI)

wherein
$R^9$ to $R^{13}$ denote, independently of one another, $C_1$ to $C_{20}$ alkyl, preferably methyl, or $C_6$ to $C_{20}$ aryl, preferably phenyl, and $R^{12}$ and $R^{13}$ may be members of a ring containing 4 or 5 carbon atoms,
Y denotes a sulphoxide or sulphone group,
n stands for the number 3, 4 or 5 and
m stands for the number 2 or 3
and the ratio of solvent to solids is from 10:1 to 1:1 and the reaction is carried out for 1 to 50 hours, preferably 5 to 24 hours, at a reaction temperature of from 100° to 350° C., preferably from 150° to 250° C.

The following are examples of monomer units corresponding to formula (I): 2-(2,4-dichlorophenyl)-benzoxazole,6-chloro-2-(2,4-dichlorophenyl)-benzoxazole, 2-(2,6-dichlorophenyl)benzoxazole and 6-chloro-2-(2,6-dichlorophenyl)-benzoxazole.

The following are examples of monomer units corresponding to formula (II): hydroquinone, 4,4'-dihydroxybiphenyl, bis-(4-hydroxyphenyl)-sulphone, 4,4'-dihydroxydiphenyl ether, 4,4'-dihydroxydiphenyl sulphide, 1,6-, 1,7-, 2,6- and 2,7-naphthalene diol, 2,2-bis-(4-hydroxyphenyl)-propane, bis-(4-hydroxyphenyl)-methane, 2,2-bis-(4-hydroxy-3,5-dimethylphenyl)-propane, 2,2-bis-(3,5-dichloro-4-hydroxyphenyl)propane and bis-(4-hydroxy-3,5-dimethylphenyl)-methane.

N-methylpyrrolidone and N-methylcaprolactam are examples of solvents corresponding to formula (IV).

N,N'-dimethylimidazolidinone-2, N,N'-dimethyl-tetrahydropyrimidone-2 and N,N'-diisobutylimidazolidinone-2 are examples of solvents corresponding to formula (V).

Examples of solvents corresponding to formula (VI) are dimethyl sulphoxide, diphenyl sulphone and sulpholan.

Examples of bases include alkali metal bases such as sodium hydroxide, potassium hydroxide, sodium methanolate, potassium carbonate and potassium bicarbonate, potassium carbonate being preferred.

Mixtures of various reactants may be dehydrated azeotropically with an entrainer such as toluene, chlorobenzene, mesitylene or o-dichlorobenzene before the beginning of the reaction.

The reactants may be mixed in any sequence and at any stage during the reaction.

The reaction may be carried out under an inert gas, e.g. nitrogen or argon.

The reaction time is from 1 to 50 hours, preferably 5 to 25 hours. The reaction temperature is from 100° to 350° C., preferably from 150° to 250° C.

The polymers may be worked up by precipitation from the reaction solution in alcohols, e.g. methanol, ethanol or isopropanol, or in water, in water/alcohol mixtures or in dilute organic or inorganic acids such as acetic acid or phosphoric acid, followed by isolation and washing.

The polyarylene ethers according to the invention are difficultly inflammable and may be used as flame protective additives for other thermoplasts.

EXAMPLES 0.1 mol of bisphenol A, 0.1 mol of 2-(2,4-dichlorophenyl)benzoxazole, 120 ml of N-methylcaprolactam, 66 ml of toluene and 0.12 mol of potash are introduced into a reaction vessel and heated on a water separator under nitrogen for 5 hours. The toluene is then distilled off and the reaction mixture is heated to 230° C. for 1.5 hours. The reaction product is precipitated in 1 litre of 15% phosphoric acid and washed free from electrolytes. The polymer is obtained in a yield of 94%. Softening range: 151°–158° C.

Example 2

0.1 mol of bisphenol A and 0.1 mol of 6-chloro-2-(2,4-dichlorophenyl)-benzoxazole are put into the process. Yield: 99%, softening range: 173°–181° C.

Example 3

0.1 mol of 4,4'-dihydroxybiphenyl and 0 1 mol of 2-(2,4-dichlorophenyl)-benzoxazole are put into the process. Yield: 96%, softening range: 208° to 210° C.

Example 4

0.1 mol of 4,4'-dihydroxybiphenyl and 0.1 mol of 6-chloro-2-(2,4-dichlorophenyl)-benzoxazole are put into the process. Yield: 94%, softening range: 211° to 215° C.

We claim:
1. Polyarylene ether containing benzoxazole groups, prepared by the reaction of monomer units corresponding to formula (I) and monomer units corresponding to formula (II)

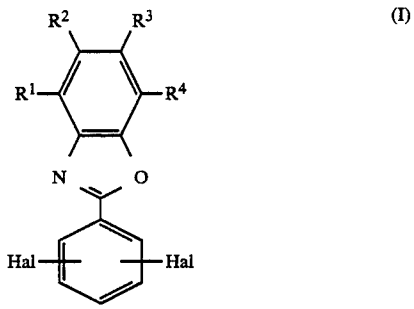

wherein
$R^1$, $R^2$, $R^3$ and $R^4$ denote, independently of one another, hydrogen, $C_1$ to $C_{20}$ alkyl, $C_6$ to $C_{14}$ alkaryl or arylalkyl and at most one of $R^1$ to $R^4$ is Hal and any two of $R^1$ to $R^4$ when in the ortho position to one another additionally together denote a ring containing at most 12 carbon atoms, Hal denotes fluoro, chloro, bromo or iodo in the 2,4- or 2,6-positions of the phenyl ring and Ar denotes m-phenylene, p-phenylene, naphthylene or a moiety corresponding to formula III

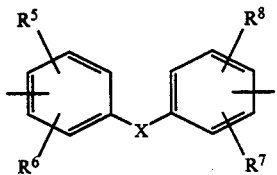

wherein

X is a chemical bond or X denotes an oxygen atom, a sulphur atom, a sulphone group or $C_1$ to $C_{20}$ alkylene, and $R^5$ to $R^8$ denote, independently of one another, hydrogen, $C_1$ to $C_{20}$ alkyl, $C_6$ to $C_{14}$ aryl or a halogen atom.

2. Polyarylene ether according to claim 1 wherein at least one of $R^1$, $R^2$, $R^3$ and $R^4$ is methyl.

3. Polyarylene ether according to claim 1 wherein Hal is chloro.

4. Polyarylene ether according to claim 1 wherein X is 2,2'-propylene.

5. Polyarylene ether according to claim 1 wherein at least one of $R^5$ to $R^8$ is methyl.

6. Process for the preparation of polyarylene ether containing benzoxazole groups wherein monomers corresponding to formulae (I) and (II) are reacted in the molar ratio of (I):(II) of from 0.98:1 to 1.02:1 and, based on the quantity of monomer units of the formula (II) in the presence of from 1 to 2 equivalents of a base and the reaction is carried out in a dipolar aprotic solvent corresponding to formula (IV), (V) or (VI)

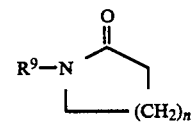

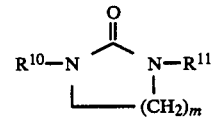

wherein $R^9$ to $R^{13}$ denote, independently of one another, $C_1$ to $C_{20}$ alkyl or $C_6$ to $C_{20}$ aryl, and $R^{12}$ and $R^{13}$ together are members of a ring containing 4 or 5 carbon atoms, Y denotes a sulphoxide or sulphone group, n stands for the number 3, 4 or 5 and m stands for the number 2 or 3 wherein the ratio of solvent to solids is from 10:1 to 1:1 and the reaction is carried out for 1 to 50 hours, at a reaction temperature of from 100° to 350° C.

7. The process according to claim 6 wherein the reaction is carried out in the presence of 1 to 1.2 equivalents of a base.

8. The process according to claim 6 wherein at least one of $R^9$ to $R^{13}$ in formulae (IV), (V) or (VI) is methyl or phenyl.

9. The process according to claim 6 wherein the reaction is carried out at a temperature from 150° to 250° C. for 5 to 25 hours.

* * * * *